(12) United States Patent
Li et al.

(10) Patent No.: US 11,258,476 B2
(45) Date of Patent: Feb. 22, 2022

(54) FREQUENCY HOPPING PROCESSING METHOD AND DEVICE

(71) Applicant: HUAWEI TECHNOLOGIES CO., LTD., Shenzhen (CN)

(72) Inventors: Junchao Li, Shanghai (CN); Yi Wang, Shanghai (CN); Hao Tang, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/876,102

(22) Filed: May 17, 2020

(65) Prior Publication Data
US 2020/0366334 A1    Nov. 19, 2020

Related U.S. Application Data

(63) Continuation of application No. PCT/CN2018/114129, filed on Nov. 6, 2018.

(30) Foreign Application Priority Data

Nov. 17, 2017    (CN) .......................... 201711148953.2

(51) Int. Cl.
*H04B 1/713*    (2011.01)
*H04L 5/00*    (2006.01)
*H04L 5/10*    (2006.01)
*H04W 72/04*    (2009.01)

(52) U.S. Cl.
CPC ........... *H04B 1/713* (2013.01); *H04L 5/0051* (2013.01); *H04L 5/10* (2013.01); *H04W 72/0446* (2013.01)

(58) Field of Classification Search
None
See application file for complete search history.

(56) References Cited

U.S. PATENT DOCUMENTS

| 2009/0238241 A1 | 9/2009 | Hooli et al. |
| 2013/0022087 A1 | 1/2013 | Chen et al. |
| 2014/0293881 A1 | 10/2014 | Khoshnevis et al. |

(Continued)

FOREIGN PATENT DOCUMENTS

| CN | 101610231 A | 12/2009 |
| CN | 101917765 A | 12/2010 |

(Continued)

OTHER PUBLICATIONS

Sharp,"Slot structure of NR long PUCCH for more than 2 bits",3GPP TSG RAN WG1 Meeting #90,R1-1713334, Prague, Czech Republic, Aug. 21-25, 2017, total 4 pages.

(Continued)

*Primary Examiner* — Diane L Lo
(74) *Attorney, Agent, or Firm* — Hauptman Ham, LLP

(57) ABSTRACT

Various embodiments provide a frequency hopping processing method and a device. In those embodiments, a symbol used to transmit a demodulation reference signal of a shared channel can be determined by a communications device. A time domain frequency hopping location of the shared channel based on the symbol used to transmit the demodulation reference signal can be determined by the communications device. In this way, frequency hopping processing of a shared channel in an NR network is implemented.

20 Claims, 6 Drawing Sheets

A communications device determines a symbol used to transmit a demodulation reference signal of a shared channel — 101

The communications device determines a time domain frequency hopping location of the shared channel based on the symbol used to transmit the demodulation reference signal — 102

(56) References Cited

U.S. PATENT DOCUMENTS

| | | |
|---|---|---|
| 2016/0087774 A1 | 3/2016 | Guo et al. |
| 2018/0183491 A1 | 6/2018 | Takeda et al. |
| 2019/0013912 A1 | 1/2019 | Tomeba et al. |
| 2019/0052420 A1* | 2/2019 | Manolakos ............. H04L 5/005 |
| 2020/0146032 A1* | 5/2020 | Bae ....................... H04L 5/0051 |
| 2020/0266944 A1* | 8/2020 | Kakishima ............ H04L 5/0012 |
| 2021/0067194 A1* | 3/2021 | Takeda .................. H04L 5/0012 |

FOREIGN PATENT DOCUMENTS

| | | |
|---|---|---|
| CN | 101978664 A | 2/2011 |
| CN | 102082595 A | 6/2011 |
| CN | 104125186 A | 10/2014 |
| CN | 105144817 A | 12/2015 |
| WO | 2014110757 | 7/2014 |
| WO | 2017026549 A1 | 2/2017 |
| WO | 2017110166 A1 | 6/2017 |

OTHER PUBLICATIONS

ZTE et al.,"On long-PUCCH for upto 2 bits",3GPP TSG RAN WG1 Meeting 90bis,R1-1717515,Prague, CZ, Oct. 9-13, 2017, total 12 pages.

Panasonic,"Channel structure and frequency-hopping details of long-PUCCH for UCI of up to 2 bits",3GPP TSG RAN WG1 Meeting #90bis,R1-1718254,Prague, CZ, Oct. 9-13, 2017, total 4 pages.

Qualcomm Incorporated,"Long PUCCH design with 1 or 2 bits UCI payload",3GPP TSG RAN WG1 Meeting 90bis , R1-1718562,Prague, CZ, Oct. 9-13, 2017, total 10 pages.

\* cited by examiner

FREQUENCY HOPPING PROCESSING METHOD AND DEVICE

CROSS-REFERENCE TO RELATED APPLICATIONS

This application is a continuation of International Application No. PCT/CN2018/114129, filed on Nov. 6, 2018, which claims priority to Chinese Patent Application No. 201711148953.2, filed on Nov. 17, 2017. The disclosures of the aforementioned applications are hereby incorporated by reference in their entireties.

TECHNICAL FIELD

This disclosure relates to the field of communications technologies, and in particular, to a frequency hopping processing method and a device.

BACKGROUND

Because frequency hopping can decrease interference and bring a good diversity gain, frequency hopping of channels is usually supported in each communications network.

In the prior art, shared channels in a long term evolution (LTE) network, for example, a physical downlink shared channel (PDSCH) and a physical downlink control channel (PDCCH) all support intra-frame frequency hopping. In addition, a time domain length of a shared channel in the LTE network is basically fixed, and a frequency hopping manner supported by the shared channel is put forward on the basis that the time domain length of the shared channel is basically fixed.

However, in a new radio (NR) network, flexible configuration of a start symbol and an end symbol of a shared channel is supported, and a time domain length of the shared channel is not fixed anymore. Consequently, in the NR network, how to implement frequency hopping of a shared channel becomes an urgent problem to be solved currently.

SUMMARY

Various embodiments provide a frequency hopping processing method and a device, to implement frequency hopping processing of a shared channel in an NR network.

According to a first aspect, one embodiment provides a frequency hopping processing method, including:

determining, by a communications device, a symbol used to transmit a demodulation reference signal of a shared channel; and determining, by the communications device, a time domain frequency hopping location of the shared channel based on the symbol used to transmit the demodulation reference signal.

In the solution, the communications device may be a terminal or a network device. The demodulation reference signal may be an additional demodulation reference signal different from a pre-positioned demodulation reference signal in front of the shared channel.

In the foregoing solution, the communications device determines the symbol used to transmit the demodulation reference signal of the shared channel and determines the time domain frequency hopping location of the shared channel based on the symbol used to transmit the demodulation reference signal, so that the communications device determines the time domain frequency hopping location of the shared channel based on the symbol used to transmit the demodulation reference signal of the shared channel, thereby implementing frequency hopping of the shared channel in an NR network.

In a possibly implemented design, the time domain frequency hopping location is a start symbol of a second hop of the shared channel, or the time domain frequency hopping location is an end symbol of a first hop of the shared channel.

In a possibly implemented design, a quantity of symbols used to transmit the demodulation reference signal is M, and M is a positive integer.

The determining, by the communications device, a time domain frequency hopping location of the shared channel based on the symbol used to transmit the demodulation reference signal includes:

determining, by the communications device, the time domain frequency hopping location of the shared channel based on a predefined symbol among M symbols used to transmit the demodulation reference signal.

In the solution, when M is equal to 1, the predefined symbol may be understood as a symbol used to transmit the demodulation reference signal. When M is greater than 1, the predefined symbol may be understood as a symbol having a minimum symbol index value among the M symbols, the predefined symbol may be understood as a symbol having a second-minimum symbol index value among the M symbols, or the predefined symbol may be understood as a symbol having a maximum symbol index value among the M symbols or may be understood as a symbol having a second-maximum symbol index value among the M symbols.

In a possibly implemented design, the predefined symbol among the M symbols has a minimum symbol index value among the M symbols.

In a possibly implemented design, the communications device is a network device, the quantity of symbols used to transmit the demodulation reference signal is M, and M is an integer greater than or equal to 2.

The determining, by the communications device, a time domain frequency hopping location of the shared channel based on the symbol used to transmit the demodulation reference signal includes:

selecting, by the communications device, a symbol among N predefined symbols, where the N predefined symbols are a subset of M symbols used to transmit the demodulation reference signal, and N is a positive integer greater than or equal to 2 and less than or equal to M; and determining, by the communications device, the time domain frequency hopping location of the shared channel based on the symbol; and the method further includes:

sending, by the communications device, indication information to a terminal, where the indication information is used to indicate the symbol among the N predefined symbols.

In a possibly implemented design, the communications device is a terminal, the quantity of symbols used to transmit the demodulation reference signal is M, and M is an integer greater than or equal to 2;

the method further includes: receiving, by the communications device, indication information sent by a network device, where the indication information is used to indicate a symbol among N predefined symbols, and the N predefined symbols are a subset of M symbols used to transmit the demodulation reference signal; and the determining, by the communications device, a time domain frequency hopping location of the shared channel based on the symbol used to transmit the demodulation reference signal includes:

selecting, by the communications device, the symbol among the N predefined symbols according to the indication information, where N is a positive integer greater than or equal to 2 and less than or equal to M; and determining, by the communications device, the time domain frequency hopping location of the shared channel based on the symbol.

In the solution, the N predefined symbols may specifically have minimum symbol index values among the M symbols, the N predefined symbols may specifically have maximum symbol index values among the M symbols, the N predefined symbols may specifically have symbol index values other than the maximum symbol index value and the minimum symbol index value among the M symbols, or the N predefined symbols may specifically have a symbol index value less than or equal to a preset symbol index value among the M symbols.

In a possibly implemented design, the N predefined symbols have minimum symbol index values among the M symbols.

In a possibly implemented design, the determining, by the communications device, the time domain frequency hopping location of the shared channel based on the symbol includes:

using, by the communications device, the symbol as the time domain frequency hopping location of the shared channel; or using, by the communications device, a symbol obtained after the symbol is shifted, as the time domain frequency hopping location of the shared channel.

In a possibly implemented design, the quantity of symbols used to transmit the demodulation reference signal is 1; and the determining, by the communications device, a time domain frequency hopping location of the shared channel based on the symbol used to transmit the demodulation reference signal includes:

determining, by the communications device based on the symbol used to transmit the demodulation reference signal, that the time domain frequency hopping location is null.

In the solution, that the time domain frequency hopping location is null may be understood as that frequency hopping is not performed, or that a time domain length of the first hop of the shared channel is a length of the shared channel and a time domain length of the second hop of the shared channel is 0.

In a possibly implemented design, the shared channel includes a physical downlink shared channel and a physical uplink shared channel; and a time domain frequency hopping location of the physical uplink shared channel and a time domain frequency hopping location of the physical downlink shared channel are different.

According to a second aspect, one embodiment provides a communications device, including:

a first determining unit, configured to determine a symbol used to transmit a demodulation reference signal of a shared channel; and a second determining unit, configured to determine a time domain frequency hopping location of the shared channel based on the symbol used to transmit the demodulation reference signal.

In a possibly implemented design, the time domain frequency hopping location is a start symbol of a second hop of the shared channel, or the time domain frequency hopping location is an end symbol of a first hop of the shared channel.

In a possibly implemented design, a quantity of symbols used to transmit the demodulation reference signal is M, and M is a positive integer.

The second determining unit is specifically configured to determine the time domain frequency hopping location of the shared channel based on a predefined symbol among M symbols used to transmit the demodulation reference signal.

In a possibly implemented design, the predefined symbol among the M symbols has a minimum symbol index value among the M symbols.

In a possibly implemented design, the communications device is a network device, the quantity of symbols used to transmit the demodulation reference signal is M, and M is an integer greater than or equal to 2;

the second determining unit is specifically configured to:

select a symbol among N predefined symbols, where the N predefined symbols are a subset of M symbols used to transmit the demodulation reference signal, and N is a positive integer greater than or equal to 2 and less than or equal to M; and determine the time domain frequency hopping location of the shared channel based on the symbol; and the communications device further includes: a sending unit, configured to send indication information to a terminal, where the indication information is used to indicate the symbol among the N predefined symbols.

In a possibly implemented design, the communications device is a terminal, the quantity of symbols used to transmit the demodulation reference signal is M, and M is an integer greater than or equal to 2;

the communications device further includes: a receiving unit, configured to receive indication information sent by a network device, where the indication information is used to indicate a symbol among N predefined symbols, and the N predefined symbols are a subset of M symbols used to transmit the demodulation reference signal; and the second determining unit is specifically configured to:

select the symbol among the N predefined symbols according to the indication information, where N is a positive integer greater than or equal to 2 and less than or equal to M; and determine the time domain frequency hopping location of the shared channel based on the symbol.

In a possibly implemented design, the N predefined symbols have minimum symbol index values among the M symbols.

In a possibly implemented design, the determining, by the second determining unit, the time domain frequency hopping location of the shared channel based on the symbol specifically includes:

using the symbol as the time domain frequency hopping location of the shared channel; or using a symbol obtained after the symbol is shifted, as the time domain frequency hopping location of the shared channel.

In a possibly implemented design, the quantity of symbols used to transmit the demodulation reference signal is 1; and the second determining unit is specifically configured to determine, based on the symbol used to transmit the demodulation reference signal, that the time domain frequency hopping location is null.

In a possibly implemented design, the shared channel includes a physical downlink shared channel and a physical uplink shared channel; and a time domain frequency hopping location of the physical uplink shared channel and a time domain frequency hopping location of the physical downlink shared channel are different.

For beneficial effects of the communications device provided in the foregoing second aspect and the possible implementations of the second aspect, refer to the beneficial effects brought by the foregoing first aspect and the possible implementations of the first aspect. Details are not described herein again.

According to a third aspect, one embodiment provides a communications device, including a processor and a memory, where the memory is configured to store a program, and the processor invokes the program stored in the memory to perform the method according to any one of the foregoing first aspect.

According to a fourth aspect, one embodiment provides a storage medium, storing a computer program, where when the computer program is executed by a processor, the method according to any one of the foregoing first aspect is implemented.

According to a fifth aspect, one embodiment provides a chip system, including a processor, configured to support a communications device in implementing the method according to any one of the foregoing first aspect.

In the frequency hopping processing method and the device provided in the various embodiments, the communications device determines the symbol used to transmit the demodulation reference signal of the shared channel and determines the time domain frequency hopping location of the shared channel based on the symbol used to transmit the demodulation reference signal, so that the communications device determines the time domain frequency hopping location of the shared channel based on the symbol used to transmit the demodulation reference signal of the shared channel, thereby implementing frequency hopping of the shared channel in the NR network.

DESCRIPTION OF EMBODIMENTS

Figure 1:
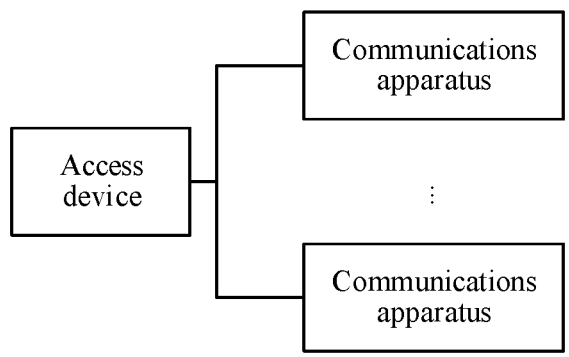
FIG. 1 is a schematic diagram of an application architecture for a frequency hopping processing method according to one embodiment.

A frequency hopping processing method and a device provided in various embodiments may be applied to frequency hopping processing of a shared channel in an NR network. As shown in FIG. 1, FIG. 1 shows a communications system provided in one embodiment. The communications system includes an access device and one or more communications apparatuses connected to the access device. Both the access device and the communications apparatus may support frequency hopping processing of a shared channel.

The access device is a device accessing a core network, and may be, for example, a base station, a broadband network gateway (BNG), an aggregation switch, or a non-3rd generation partnership project (3GPP) access device in an NR system or a future evolved public land mobile network (PLMN). The base station may include a variety of forms of base stations, for example, a macro base station, a micro base station (also referred to as a small cell), a relay station, or an access point, and this is not specifically limited in the various embodiments. For ease of description, the foregoing access devices are collectively referred to as network devices in the embodiments of the present invention.

The communications apparatus may be a terminal, a chip, or the like, and this is not specifically limited in the various embodiments. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in an NR system or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or the like. This is not limited in the various embodiments. For ease of description, the foregoing communications apparatuses are collectively referred to as terminals in the embodiments of the present invention.

The network device may include a base station, and the base station may be a gNb in the NR network.

The shared channel may be a physical uplink shared channel and/or a physical downlink shared channel. The shared channel may be configured to transmit data.

The frequency hopping means that a carrier frequency hops in a very wide frequency band range based on a sequence, that is, there is a frequency shift between frequency domain resources used to transmit data among a plurality of sub-time units in a time unit.

The time unit is used to indicate a time unit in a time domain, for example, the time unit may be a sampling point, a symbol, a mini-slot, a slot, a subframe, or a radio frame.

Time unit information may include a type, a length, a structure, or the like of the time unit.

The frequency band range may also be referred to as a bandwidth (bandwidth), for example, the frequency band range may be a section of continuous resources in frequency domain. The bandwidth may sometimes be referred to as a carrier bandwidth, a virtual carrier bandwidth, a bandwidth part (BWP), a carrier bandwidth part (carrier bandwidth part), a subband bandwidth, a narrowband bandwidth, or another name. The names are not limited herein. The virtual carrier bandwidth may be a maximum carrier bandwidth. For example, one BWP includes K (K>0) continuous subcarriers; one BWP is a frequency domain resource on which N non-overlapping continuous resource blocks (RB) are located, and a subcarrier spacing of the RBs may be 15 KHz, 30 KHz, 60 KHz, 120 KHz, 240 KHz, 480 KHz, or another value; or one BWP is a frequency domain resource on which M non-overlapping continuous resource block groups (RBG) are located, one RBG includes P continuous RBs, and a subcarrier spacing of the RBs may be 15 KHz, 30 KHz, 60 KHz, 120 KHz, 240 KHz, 480 KHz, or another value.

It should be noted that when the terminal is a transmit end, the network device is a receive end; and when the network device is a transmit end, the terminal is a receive end.

Example embodiments are used below to describe in detail the technical solutions herein. The following several example embodiments may be combined with each other, and a same or similar concept or process may not be described repeatedly in some embodiments.

Figure 2:
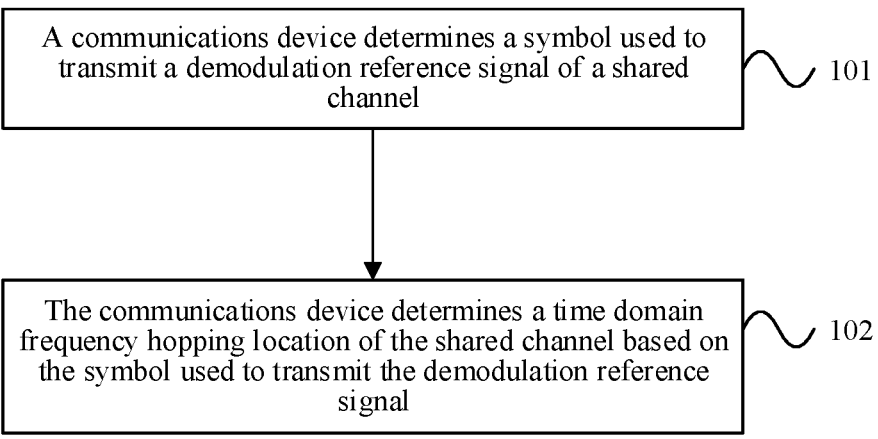
FIG. 2 is a flowchart of a frequency hopping processing method according to one embodiment.

FIG. 2 is a flowchart of a frequency hopping processing method according to one embodiment. As shown in FIG. 2, the method in this embodiment may include the following steps.

Step 201: A communications device determines a symbol used to transmit a demodulation reference signal of a shared channel.

In this step, the communications device may be the foregoing terminal or the foregoing network device. The demodulation reference signal may be an additional demodulation reference signal different from a pre-positioned demodulation reference signal in front of the shared channel. The symbol used to transmit the demodulation reference signal may be further used to transmit another signal. This is not limited herein. For example, assuming that a symbol 1 is used to transmit a demodulation reference signal and a signal other than the demodulation reference signal and a symbol 2 is used to transmit the demodulation reference signal, the symbol 1 and the symbol 2 may be considered as symbols used to transmit the demodulation reference signal.

In some embodiments, the communications device may determine, based on configuration information of the demodulation reference signal and an end symbol of the shared channel, a symbol used to transmit the demodulation reference signal. The determining, by the communications device based on configuration information of the demodulation reference signal and an end symbol of the shared channel, a symbol used to transmit the demodulation reference signal may include: determining, based on at least one of the following, a symbol used to transmit the demodulation reference signal: a correspondence between different end symbols of a shared channel and symbols used to transmit the demodulation reference signal, and a correspondence between configuration information of a demodulation reference signal and symbols used to transmit the demodulation reference signal. For a physical downlink shared channel, configuration information of a demodulation reference signal may be shown in the following Table 1, and for a physical uplink shared channel, configuration information of a demodulation reference signal may be specifically shown in the following Table 2.

TABLE 1

| Location of an end symbol of a physical downlink shared channel | Location of a symbol used to transmit a demodulation reference signal | | | |
|---|---|---|---|---|
| | 0 | 1 | 2 | 3 |
| ≤7 | — | — | — | — |
| 8 | — | 7 | — | — |
| 9 | — | 9 | 6, 9 | — |
| 10 | — | 9 | 6, 9 | — |
| 11 | — | 9 | 6, 9 | 5, 8, 11 |
| 12 | — | 11 | 7, 11 | 5, 8, 11 |
| 13 | — | 11 | 7, 11 | 5, 8, 11 |

TABLE 2

| Location of an end symbol of a physical uplink shared channel | Location of a symbol used to transmit a demodulation reference signal | | | |
|---|---|---|---|---|
| | 0 | 1 | 2 | 3 |
| ≤7 | — | — | — | — |
| 8 | — | 7 | — | — |
| 9 | — | 9 | 6, 9 | — |
| 10 | — | 9 | 6, 9 | — |
| 11 | — | 9 | 6, 9 | 5, 8, 11 |
| 12 | — | 11 | 7, 11 | 5, 8, 11 |
| 13 | — | 11 | 7, 11 | 5, 8, 11 |

Notes: 0, 1, 2, and 3 in Table 1 and Table 2 are respectively used to indicate quantities of symbols used to transmit the demodulation reference signal; and "-" is used to indicate null, that is, there is no symbol used to transmit the demodulation reference signal.

It should be noted that locations (or symbol index values) of symbols are obtained when the symbols in a time unit are numbered in a chronological order, and the time unit may be a slot, a subframe, a radio frame, or another. This is not limited in this application.

Figure 3A:
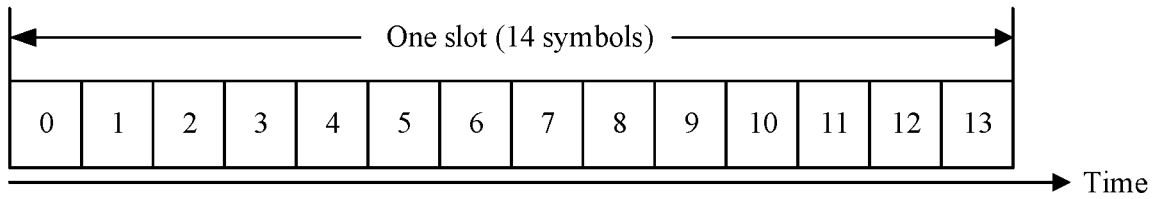
FIG. 3A is a schematic diagram of a location of a symbol according to one embodiment.

In an example in which a time unit is a slot and one slot includes 14 symbols, a relationship among locations of the symbols may be shown in FIG. 3A. 14 symbols of one slot in time domain are numbered in a chronological order, and serial numbers of the symbols are 0, 1, 2, . . . , 13. 0, 1, 2, . . . , 13 may be considered as locations (or symbol index values) of the symbols.

It should be noted that an example in which a symbol used to transmit the demodulation reference signal of the physical downlink shared channel is same as a symbol used to transmit the demodulation reference signal of the physical uplink shared channel is used in the foregoing Table 1 and the foregoing Table 2, and the symbol used to transmit the demodulation reference signal of the physical downlink shared channel may alternatively be different from the symbol used to transmit the demodulation reference signal of the physical uplink shared channel. This is not limited in this application.

Refer to the foregoing Table 1. Assuming that a location of an end symbol of a physical downlink control channel is 10, when a quantity of symbols used to transmit the demodulation reference signal is 1, the symbol used to transmit the demodulation reference signal is a symbol at a location 9; and when a quantity of symbols used to transmit the demodulation reference signal is 2, the symbols used to transmit the demodulation reference signal are symbols at the location 9 and a location 11. It should be noted that the quantity of symbols used to transmit the demodulation reference signal may be flexibly designed by the communications device based on a transmission requirement. For example, a network device configures, based on a channel coherence time of a terminal, the quantity of symbols for transmitting the demodulation reference signal. For example, when the channel coherence time of the terminal is long, the network device may configure fewer symbols to transmit the demodulation reference signal, so that more symbols may be used to transmit data, to improve a throughput; or when the channel coherence time of the terminal is short, the network device may configure more symbols to transmit the demodulation reference signal, so that accuracy of channel estimation is ensured, to improve data transmission reliability. The channel coherence time refers to a maximum time difference range for keeping a channel constant.

Step 202: The communications device determines a time domain frequency hopping location of the shared channel based on the symbol used to transmit the demodulation reference signal.

Figure 3B:
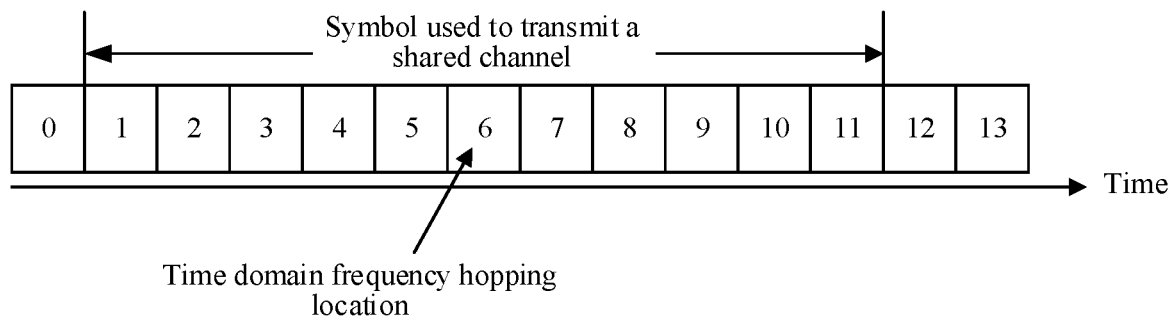
FIG. 3B is a first schematic diagram of a shared channel and a time domain frequency hopping location according to one embodiment.

In this step, the time domain frequency hopping location may be used to indicate a time domain length of a first hop and a time domain length of a second hop of the shared channel. The time domain length may be understood as a quantity of symbols. In some embodiments, the time domain frequency hopping location may be specifically an end symbol of the first hop of the shared channel. For example, the time domain frequency hopping location may be a location (or a symbol index value) of an end symbol of the first hop of the shared channel. In this case, the first hop refers to symbols including a start symbol to the time domain frequency hopping location of the shared channel, the second hop refers to symbols including a symbol behind the time domain frequency hopping location to an end symbol of the shared channel, the shared channel is transmitted on a first frequency resource in the first hop, the shared channel is transmitted on a second frequency resource in the second hop, and the first frequency resource and the second frequency resource are different frequency resources. For example, as shown in FIG. 3B, assuming that symbols used to transmit a shared channel are symbols whose symbol index values are 1 to 11 shown in FIG. 3B and a time domain frequency hopping location is a symbol corresponding to an arrow shown in FIG. 3B, when the time domain frequency hopping location is an end symbol of a first hop of the shared channel, a time domain length of the first hop of the shared channel may be 6, and a time domain length of a second hop may be 5. For example, symbols corresponding to the first hop of the shared channel are symbols whose symbol index values are 1 to 6 and symbols corresponding to the second hop of the shared channel are symbols whose symbol index values are 7 to 11.

In some embodiments, the time domain frequency hopping location may be specifically a start symbol of the second hop of the shared channel. For example, the time domain frequency hopping location may be specifically a location (or a symbol index value) of the start symbol of the second hop of the shared channel. In this case, the first hop refers to symbols including the start symbol to a symbol in front of the time domain frequency hopping location of the shared channel, the second hop refers to symbols including the time domain frequency hopping location to the end symbol of the shared channel, the shared channel is transmitted on a first frequency resource in the first hop, the shared channel is transmitted on a second frequency resource in the second hop, and the first frequency resource and the second frequency resource are different frequency resources. For example, as shown in FIG. 3B, assuming that symbols used to transmit a shared channel are symbols whose symbol index values are 1 to 11 shown in FIG. 3B and a time domain frequency hopping location is a symbol corresponding to an arrow shown in FIG. 3B, when the time domain frequency hopping location is specifically a start symbol of a second hop of the shared channel, a time domain length of a first hop of the shared channel may be 5, and a time domain length of the second hop may be 6. To be specific, symbols corresponding to the first hop of the shared channel are symbols whose symbol index values are 1 to 5 and symbols corresponding to the second hop of the shared channel are symbols whose symbol index values are 6 to 11.

Figure 3C:
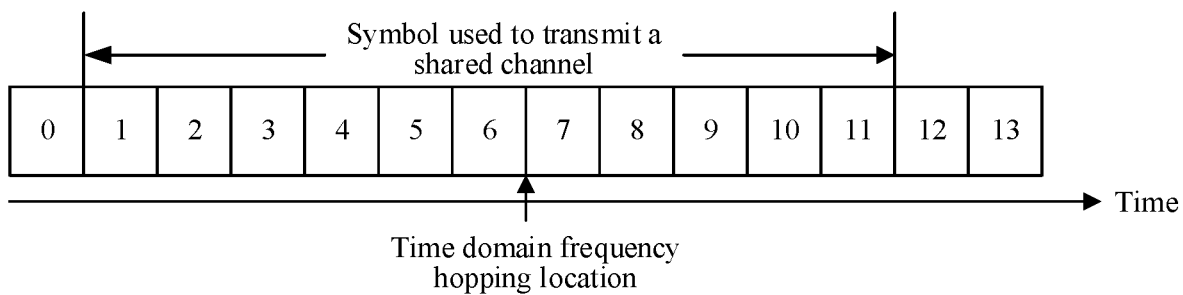
FIG. 3C is a second schematic diagram of a shared channel and a time domain frequency hopping location according to one embodiment.

In some embodiments, the time domain frequency hopping location may be specifically a location between the end symbol of the first hop and the start symbol of the second hop of the shared channel. In this case, the first hop refers to symbols from a start symbol to a symbol in front of the time domain frequency hopping location of the shared channel, the second hop refers to symbols including a symbol behind the time domain frequency hopping location to an end symbol of the shared channel, the shared channel is transmitted on a first frequency resource in the first hop, the shared channel is transmitted on a second frequency resource in the second hop, and the first frequency resource and the second frequency resource are different frequency resources. As shown in FIG. 3C, assuming that symbols used to transmit a shared channel are symbols whose symbol index values are 1 to 11 and a time domain frequency hopping location is a location corresponding to an arrow shown in FIG. 3C, a time domain length of a first hop of the shared channel may be 6 and a time domain length of a second hop may be 5. To be specific, symbols corresponding to the first hop of the shared channel are symbols whose symbol index values are 1 to 6 and symbols corresponding to the second hop of the shared channel are symbols whose symbol index values are 7 to 11.

It may be learned from the foregoing Table 1 and the foregoing Table 2 that there may be one or more symbols used to transmit the demodulation reference signal. However, to ensure that a channel can be correctly received when a transmit end and a receive end transmit the channel in a frequency hopping manner, the transmit end and the receive end need to perform frequency hopping in a same frequency hopping manner. Therefore, although there may be one or more symbols used to transmit the demodulation reference signal, a symbol finally used to determine the time domain frequency hopping location may be one symbol (the symbol is cited always subsequently) determined among the one or more symbols. Specifically, the communications device may determine the symbol in either of the following Manner 1 and the following Manner 2. Further, the communications device may determine the time domain frequency hopping location of the shared channel based on the symbol.

Manner 1

It is assumed that the quantity of symbols used to transmit the demodulation reference signal is M, and M is a positive integer. For example, the communications device determines a time domain frequency hopping location of the shared channel based on a predefined symbol among M symbols used to transmit the demodulation reference signal.

When M is equal to 1, the predefined symbol may be understood as a symbol used to transmit the demodulation reference signal. When M is greater than 1, the predefined symbol may be understood as a symbol having a minimum symbol index value among the M symbols. For example, if the M symbols are symbols whose symbol index values are 5, 8, 11, and 13 respectively, the predefined symbol may be a symbol whose symbol index value is 5. In some embodiments, the predefined symbol may be understood as a symbol having a second-minimum symbol index value among the M symbols. For example, if the M symbols are symbols whose symbol index values are 5, 8, 11, and 13 respectively, the predefined symbol may be a symbol whose symbol index value is 8. In some embodiments, the predefined symbol may be understood as a symbol having a maximum symbol index value among the M symbols. For example, if the M symbols are symbols whose symbol index values are 5, 8, 11, and 13 respectively, the predefined symbol may be a symbol whose symbol index value is 13. In some embodiments, the predefined symbol may be understood as a symbol having a second-maximum symbol index value among the M symbols. For example, if the M symbols are symbols whose symbol index values are 5, 8, 11, and 13 respectively, the predefined symbol may be a symbol whose symbol index value is 11. This is not limited in the present disclosure.

Manner 2

It is assumed that the quantity of symbols used to transmit the demodulation reference signal is M, and M is an integer greater than or equal to 2. Specifically, a symbol may be selected among N predefined symbols, where the N predefined symbols are a subset of the M symbols, and N is a positive integer greater than or equal to 2 and less than or equal to M. The N predefined symbols may specifically have minimum symbol index values among the M symbols. For example, if the M symbols are four symbols whose symbol index values are 5, 8, 9, and 11 respectively, the N symbols may be two symbols whose symbol index values are 5 and 8. Alternatively, the N predefined symbols may specifically have maximum symbol index values among the M symbols. For example, if the M symbols are four symbols whose symbol index values are 5, 8, 9, and 11 respectively, the N symbols may be two symbols whose symbol index values are 9 and 11. Alternatively, the N predefined symbols may specifically have symbol index values other than a maximum symbol index value and a minimum symbol index value among the M symbols. For example, the M symbols are four symbols whose symbol index values are 5, 8, 9, and 11 respectively, the N symbols may be two symbols whose symbol index values are 8 and 9. Alternatively, the N predefined symbols may specifically have symbol index values less than or equal to a preset symbol index value among the M symbols. For example, if the M symbols are four symbols whose symbol index values are 5, 8, 9, and 11 respectively, the N symbols may be three symbols whose symbol index values are 5, 8, and 9 less than 10. This is not limited in the present disclosure.

In Manner 2, to ensure that the symbol selected by the network device is same as the symbol selected by the terminal, the network device may select the symbol among the N predefined symbols and send, to the terminal, indication information used to indicate the symbol selected among the N predefined symbols, and the terminal further selects the symbol among the N predefined symbols according to the indication information.

In some embodiments, when the communications device is a network device, the communications device may select a symbol among the N predefined symbols. In addition, the communications device further needs to send indication information to the terminal, where the indication information is used to indicate the symbol among the N predefined symbols. When the communications device is a terminal, the communications device selects the symbol among the N predefined symbols according to the indication information. The indication information may specifically indicate the symbol or indicate a rule for selecting the symbol, for example, a relationship between the symbol and the N symbols. Further, the terminal may select the symbol according to the rule. This is not limited in the present disclosure. For example, when the N predefined symbols are two symbols whose symbol index values are 5 and 8 and the symbol is a symbol whose symbol index value is 8, the indication information may indicate that the symbol is a symbol whose symbol index value is 8 in a slot or indicate that the symbol is the second symbol of the two symbols whose symbol index values are 5 and 8.

The foregoing indication information may be sent to the terminal by the network device through downlink control information (Downlink Control Information, DCI), broadcast information, higher layer (static) information, or the like. This is not limited in the present disclosure. The broadcast information may be carried through a master information block (MIB), and the higher layer information may be carried through radio resource control (Radio Resource Control, RRC) signaling.

Figure 4A:
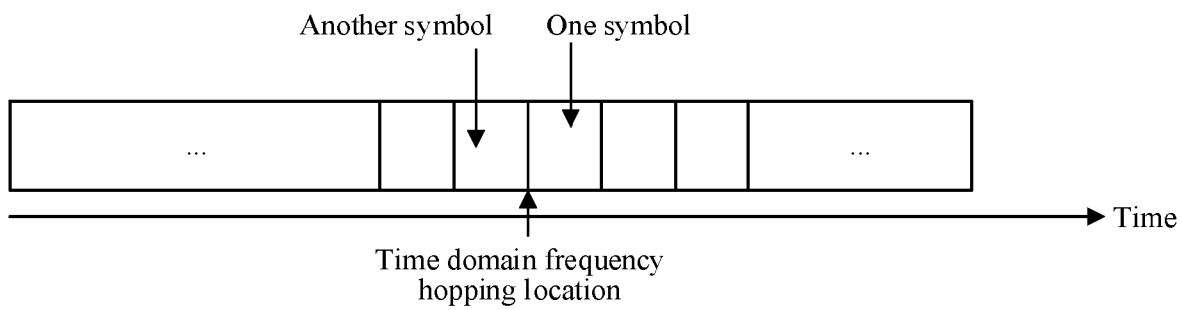
FIG. 4A is a first schematic diagram of a time domain frequency hopping location according to one embodiment.
Figure 4B:
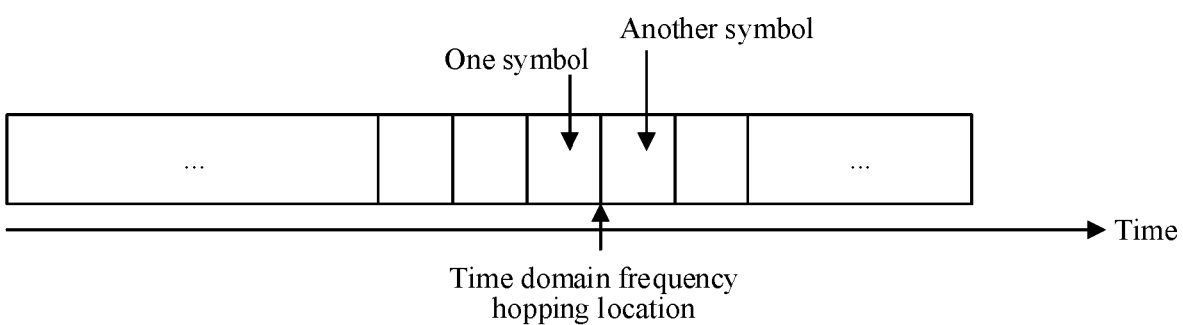
FIG. 4B is a second schematic diagram of a time domain frequency hopping location according to one embodiment.

In some embodiments, the determining, by the communications device, a time domain frequency hopping location of the shared channel based on the symbol may specifically include: using, by the communications device, the symbol as the time domain frequency hopping location of the shared channel. For example, assuming that a symbol index value of the symbol is 1, the time domain frequency hopping location may be considered as the symbol whose symbol index value is 1. It should be noted that an example in which the time domain frequency hopping location is a symbol other than a location between two symbols is used herein. When the time domain frequency hopping location is a location between two symbols, specifically, as shown in FIG. 4A, the communications device may use a location between the symbol and another symbol before the symbol as the time domain frequency hopping location; or as shown in FIG. 4B, the communications device may use a location between the symbol and another symbol after the symbol as the time domain frequency hopping location. This is not limited in the present disclosure. Another symbol and the symbol may be two neighboring symbols in time domain.

Figure 5A:
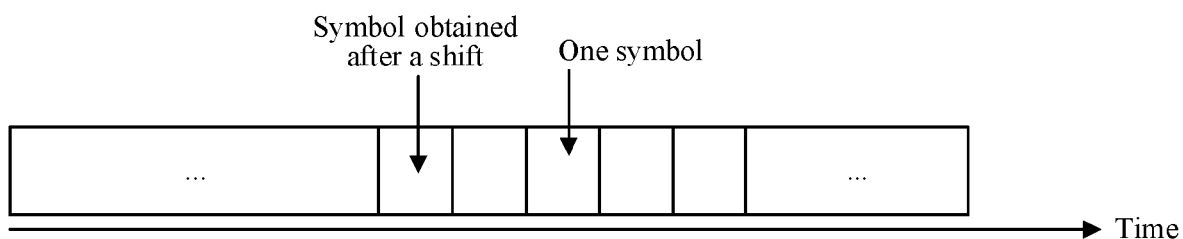
FIG. 5A is a first schematic diagram of a symbol obtained after a symbol is shifted according to one embodiment.
Figure 5B:
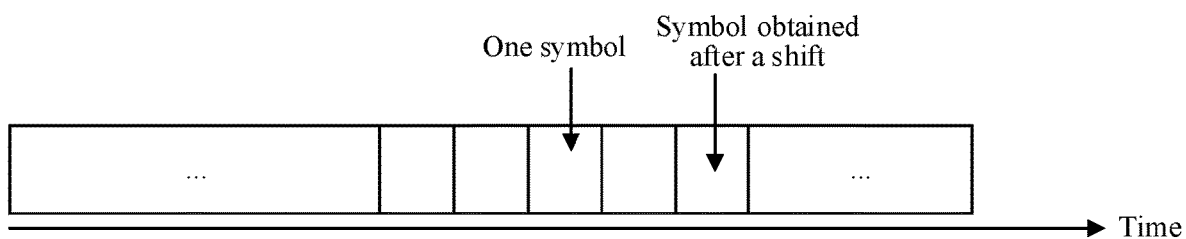
FIG. 5B is a second schematic diagram of a symbol obtained after a symbol is shifted according to one embodiment.

In some embodiments, the determining, by the communications device, a time domain frequency hopping location of the shared channel based on the symbol may specifically include: using, by the communications device, a symbol obtained after the symbol is shifted, as the time domain frequency hopping location of the shared channel, where the shift herein may be a shift in a time domain location. Specifically, a symbol obtained after the symbol is shifted by an offset may be used as the time domain frequency hopping location of the shared channel. The offset may include a positive number, or the offset may include both a positive number and a negative number. This is not limited in the present disclosure. When the offset includes a positive number, for example, K, the offset may specifically indicate a quantity K of symbols shifted to a specified direction, the specified direction may be a direction in which the time domain is increased or a direction in which the time domain is decreased, and the specified direction may be predefined or may be indicated by the network device. This is not limited in the present disclosure. For example, the offset may be specifically 1, 2, or 3, respectively indicating that a shift of one, two, or three symbols is performed to the direction in which the time domain is decreased. When the offset includes both a positive number and a negative number, for example, L, the offset indicates a shift direction and a quantity L of symbols that are shifted. This is not limited in the present disclosure. For example, the offset may be specifically 1, 2, 3, −1, −2, or −3. The offset −2 indicates a symbol obtained after the symbol is shifted by two symbols to the direction in which the time domain is decreased. This may be shown in FIG. 5A. The offset 2 indicates a symbol obtained after the symbol is shifted by two symbols to the direction in which the time domain is increased. This may be specifically shown in FIG. 5B.

It should be noted that the foregoing description in which a symbol obtained after the symbol is shifted is used as the time domain frequency hopping location of the shared channel is similar to the foregoing description in which the symbol is used as the time domain frequency hopping location of the shared channel, and an example in which the time domain frequency hopping location is a symbol other than a location between two symbols is used. When the time domain frequency hopping location is a location between two symbols, for a relationship between a symbol obtained after a shift and the time domain frequency hopping location, refer to the foregoing content related to FIG. 4A and FIG. 4B, and details are not described herein again.

It should be noted that the foregoing offset may be specifically a preset offset, the foregoing offset may be determined by the network device and be sent to the terminal in an information form, or the two manners are combined. This is not limited in the present disclosure.

Refer to the foregoing Table 1 and the foregoing Table 2. It may be learned that when M is equal to 1, a symbol index value of a symbol used to transmit the demodulation reference signal is large, and consequently the symbol is not suitable for being directly used as the time domain frequency hopping location of the shared channel. Therefore, the foregoing case in which M is equal to 1 may alternatively be processed in the following Manner 3.

Manner 3

In some embodiments, when M is equal to 1, that is, a quantity of symbols used to transmit a demodulation reference signal is 1, it may be directly determined that frequency hopping processing is not performed, it may be determined that a time domain frequency hopping location is null, or it may be determined that a time domain length of a first hop of a shared channel is a length of the shared channel, and a time domain length of a second hop of the shared channel is 0.

It may be learned from example implementations of Manner 1 to Manner 3 that when M is equal to 1, a predefined symbol among M symbols may be determined in Manner 1, or it may be determined, in Manner 3, that frequency hopping is not performed; or when M is greater than 1, a predefined symbol among the M symbols may be determined in Manner 2, or N predefined symbols may be determined in Manner 2. A predefined symbol and N predefined symbols herein are collectively referred to as the predefined symbols in the following descriptions.

Using an example in which when M is equal to 1, it is determined, in Manner 3, that frequency hopping is not performed; and when M is greater than 1, the predefined symbol is determined in Manner 1 and the symbol has a minimum symbol index value among the M symbols, for the configuration information of the demodulation reference signal shown in Table 1, predefined symbols among the M symbols may be specifically shown correspondingly in the following Table 3.

TABLE 3

| Location of an end symbol of a physical downlink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6 | — |
| 10 | — | — | 6 | — |
| 11 | — | — | 6 | 5 |
| 12 | — | — | 7 | 5 |
| 13 | — | — | 7 | 5 |

Using an example in which when M is equal to 1, it is determined, in Manner 3, that the frequency hopping is not performed; when M is equal to 2, the predefined symbol is determined in Manner 1 and the symbol has a minimum symbol index value among the M symbols; and when M is equal to 3, two predefined symbols are determined in Manner 2 and the two predefined symbols have minimum symbol index values among the M symbols, for the configuration information of the demodulation reference signal shown in Table 1, predefined symbols among the M symbols may be specifically shown correspondingly in the following Table 4.

TABLE 4

| Location of an end symbol of a physical downlink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6 | — |
| 10 | — | — | 6 | — |
| 11 | — | — | 6 | 5, 8 |
| 12 | — | — | 7 | 5, 8 |
| 13 | — | — | 7 | 5, 8 |

Using an example in which when M is equal to 1, it is determined, in Manner 3, that frequency hopping is not performed; and when M is greater than 1, the predefined symbol is determined in Manner 1 and the symbol has a minimum symbol index value among the M symbols, for the configuration information of the demodulation reference signal shown in Table 2, predefined symbols among the M symbols may be specifically shown correspondingly in the following Table 5.

TABLE 5

| Location of an end symbol of a physical uplink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6 | — |

TABLE 5-continued

| Location of an end symbol of a physical uplink shared channel | Predefined symbol | | | |
|---|---|---|---|---|
| | 0 | 1 | 2 | 3 |
| 10 | — | — | 6 | — |
| 11 | — | — | 6 | 5 |
| 12 | — | — | 7 | 5 |
| 13 | — | — | 7 | 5 |

Using an example in which when M is equal to 1, it is determined, in Manner 3, that the frequency hopping is not performed; when M is equal to 2, the predefined symbol is determined in Manner 1 and the symbol has a minimum symbol index value among the M symbols; and when M is equal to 3, N predefined symbols are determined in Manner 2 and the N predefined symbols have minimum symbol index values among the M symbols, for the configuration information of the demodulation reference signal shown in Table 2, predefined symbols among the M symbols may be specifically shown correspondingly in the following Table 6.

TABLE 6

| Location of an end symbol of a physical uplink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6 | — |
| 10 | — | — | 6 | — |
| 11 | — | — | 6 | 5, 8 |
| 12 | — | — | 7 | 5, 8 |
| 13 | — | — | 7 | 5, 8 |

Notes: 0, 1, 2, and 3 in Table 3 to Table 6 are respectively used to indicate quantities of symbols used to transmit the demodulation reference signal; and "-" is used to indicate that the predefined symbols are null, that is, frequency hopping is not performed.

It should be noted that the time domain length of the shared channel depends on both an end symbol of the shared channel and a start symbol of the shared channel; for a physical downlink shared channel, symbols whose symbol index values are 0 to 2 need to be excluded from a start symbol of the physical downlink shared channel, and for a physical uplink shared channel, a symbol whose symbol index value is 0 and that is used as an interval in downlink to uplink conversion needs to excluded from a start symbol of the physical uplink shared channel; therefore, when the symbol is determined by using predefined symbols shown in Table 3 to Table 6 and the symbol is used as the time domain frequency hopping location, to ensure that a length of a first hop is equal to or approximately equal to a length of a second hop.

Figure 6A:
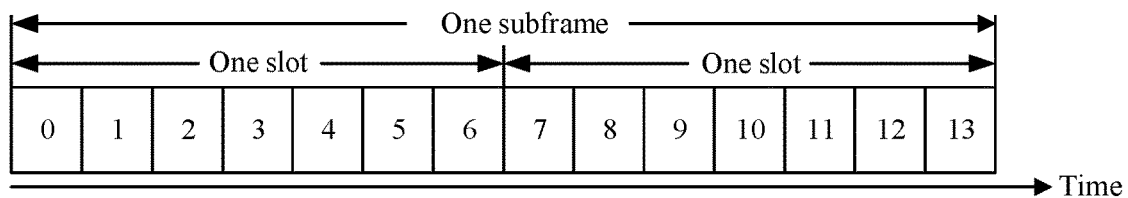
FIG. 6A is a schematic diagram of a subframe in an LTE network.

By taking an LTE network as an example, one subframe includes two slots, and each slot includes seven symbols. During intra-frame frequency hopping, a symbol in a slot in a same subframe is used as a first hop and is transmitted on a set of physical resource blocks; and a symbol in the other slot is used as a second hop and is transmitted on another set of physical resource blocks. For example, assuming that symbols used to transmit the shared channel are symbols whose symbol index values are 1 to 13 as shown in FIG. 6A, symbols whose symbol index values are 1 to 6 are used as a first hop, and symbols whose symbol index values are 7 to 13 are used as a second hop. In addition, an end symbol of the shared channel is always a symbol whose symbol index value is 13, and a start symbol of the shared channel may be a symbol whose symbol index value is 0 or a symbol whose symbol index value 1 in LTE; therefore, by using a symbol in a slot in a same subframe as a first hop and using a symbol in the other slot as a second hop, it may be ensured that a time domain length of the first hop is equal to or approximately equal to a time domain length of the second hop, so that a large diversity gain can be obtained in any channel environment. However, in NR, flexible configuration of a start symbol and an end symbol of a shared channel is supported, and lengths of shared channels of different users may be different.

Figure 6B:
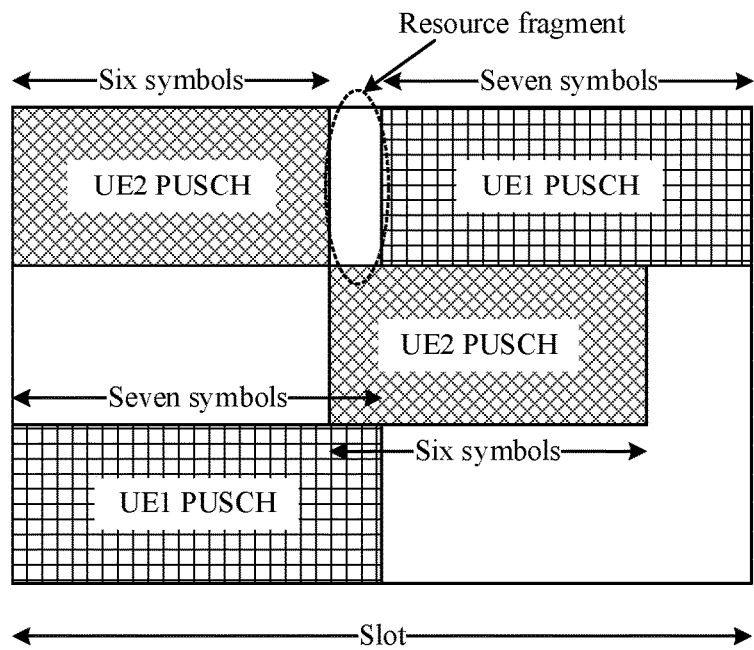
FIG. 6B is a first schematic diagram of frequency hopping of a shared channel according to one embodiment.

If the foregoing intra-frame frequency hopping manner in LTE is used in NR, that is, symbols from a start symbol to a symbol whose symbol index value is 6 are used as a first hop and symbols from a symbol whose symbol index value is 7 to an end symbol are used as a second hop, there is an excessively large time domain length difference between the first hop and the second hop, causing a problem of a low diversity gain. Specifically, assuming that a start symbol of the shared channel is a symbol whose symbol index value is 5 and an end symbol of the shared channel is a symbol whose symbol index value is 13 as shown in FIG. 6B, symbols whose symbol index values are 5 and 6 are used as a first hop and symbols whose symbol index values are 7 to 13 are used as a second hop. It may be learned that a time domain length of the first hop is a length of two symbols, a time domain length of the second hop is a length of seven symbols, and there is a large length difference between the first hop and the second hop. Consequently, when channel quality of the communications device on a frequency resource corresponding to the second hop becomes degraded, receiving quality of a vast majority of data of the communications device is degraded, affecting receiving quality of whole data.

In addition, if symbols of a first hop and a second hop are halved based on a time domain length of a shared channel in NR and a time domain length of the first hop is equal (or approximately equal) to a time domain length of the second hop, a problem of resource utilization reduction occurs due to a resource fragment when shared channels of different lengths coexist. For example, assuming that UE1 and UE2 transmit PUSCHs at the same time, a start symbol of a PUSCH (marked as a UE1 PUSCH) of the UE1 is a symbol whose symbol index value is 0, an end symbol of the PUSCH of the UE1 is a symbol whose symbol index value is 13, a start symbol of a PUSCH (marked as a UE2 PUSCH) of the UE2 is a symbol whose symbol index value is 0, and an end symbol of the PUSCH of the UE2 is a symbol whose symbol index value is 11 as shown in FIG. 6B, there is a problem that a resource corresponding to a symbol whose symbol index value is 6, of a subcarrier 3 is a resource fragment when the PUSCH of the UE1 and the PUSCH of the UE2 coexist.

Figure 6C:
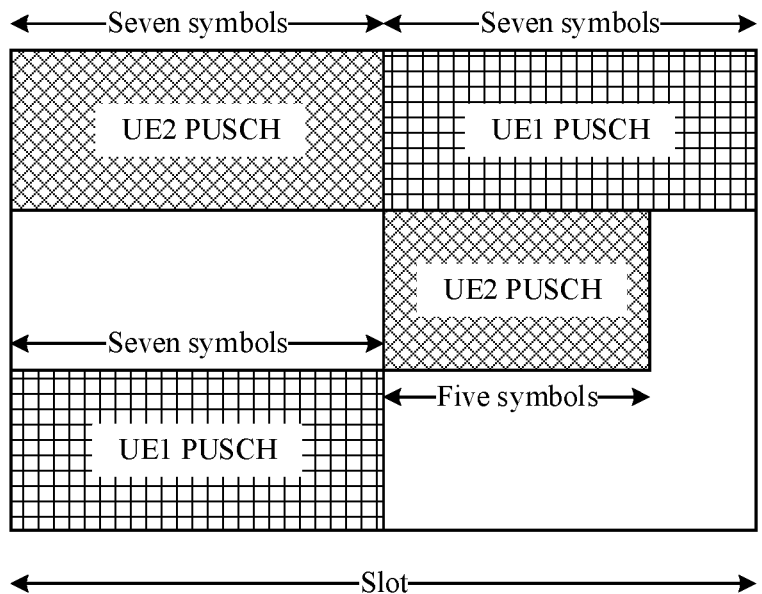
FIG. 6C is a second schematic diagram of frequency hopping of a shared channel according to one embodiment.

In this embodiment, similarly, assuming that UE1 and UE2 transmit PUSCHs at the same time, a start symbol of a PUSCH of the UE1 is a symbol whose symbol index value is 0, an end symbol of the PUSCH of the UE1 is a symbol whose symbol index value is 13, a start symbol of a PUSCH of the UE2 is a symbol whose symbol index value is 0, an end symbol of the PUSCH of the UE2 is a symbol whose symbol index value is 11, it is determined, based on Table 5 or Table 6, that the predefined symbol is a symbol whose symbol index value is 6, the symbol is used as a time domain frequency hopping location, and the time domain frequency hopping location is a start symbol of a first hop of a shared channel, compared with FIG. 6B, as shown in FIG. 6C, there is no problem that a resource corresponding to a symbol whose symbol index value is 6, of a subcarrier 3 is a resource fragment when the PUSCH of the UE1 and the PUSCH of the UE2 coexist. In addition, for the frequency hopping manner shown in FIG. 6C, a time domain length of a first hop and a time domain length of a second hop of the PUSCH of the UE2 are approximately equal; therefore, a large diversity gain can also be obtained in any channel environment. It should be noted that only an example in which the symbol is determined based on Table 5 or Table 6, and the symbol is used as the time domain frequency hopping location, so that the time domain length of the first hop is approximately equal to the time domain length of the second hop, is used herein; and for the present disclosure, the problem of a resource fragment may be specifically avoided on the basis that the time domain length of the first hop is equal to or approximately equal to the time domain length of the second hop in any one of or a combination of more than one of the foregoing manners for determining the symbol and determining the time domain frequency hopping location based on the symbol. For example:

Using an example in which when M≥1, the predefined symbol is determined in Manner 1 and the symbol has a minimum symbol index value among the M symbols, for the configuration information of the demodulation reference signal shown in Table 2, predefined symbols among the M symbols may be specifically shown correspondingly in the following Table 7.

TABLE 7

| Location of an end symbol of a physical uplink | Predefined symbol | | | |
|---|---|---|---|---|
| shared channel | 0 | 1 | 2 | 3 |
| ≤7 | — | — | — | — |
| 8 | — | 7 | — | — |
| 9 | — | 9 | 6 | — |
| 10 | — | 9 | 6 | — |
| 11 | — | 9 | 6 | 5 |
| 12 | — | 11 | 7 | 5 |
| 13 | — | 11 | 7 | 5 |

Notes: 0, 1, 2, and 3 in Table 7 are respectively used to indicate quantities of symbols used to transmit the demodulation reference signal; and "-" is used to indicate that the predefined symbols are null, that is, frequency hopping is not performed.

Similarly, assuming that UE1 and UE2 transmit PUSCHs at the same time, a start symbol of a PUSCH of the UE1 is a symbol whose symbol index value is 0, an end symbol of the PUSCH of the UE1 is a symbol whose symbol index value is 13, a start symbol of a PUSCH of the UE2 is a symbol whose symbol index value is 0, an end symbol of the PUSCH of the UE2 is a symbol whose symbol index value is 11, it is determined, based on Table 7, that the predefined symbol is a symbol whose symbol index value is 9, a symbol obtained by shifting the symbol by three symbols to a direction in which the time domain is decreased is used as a time domain frequency hopping location, and the time domain frequency hopping location is a start symbol of a first hop of a shared channel, compared with FIG. 6B, as shown in FIG. 6C, there is no problem that a resource corresponding to a symbol whose symbol index value is 6, of a subcarrier 3 is a resource fragment when the PUSCH of the UE1 and the PUSCH of the UE2 coexist. In addition, for the frequency hopping manner shown in FIG. 6C, a time domain length of a first hop and a time domain length of a second hop of the PUSCH of the UE2 are approximately equal; therefore, a large diversity gain can also be obtained in any channel environment.

It should be noted that, during specific implementation, a time domain frequency hopping location of a physical uplink shared channel and a time domain frequency hopping location of a physical downlink shared channel may be the same or different. This is not limited in the present disclosure. That the time domain frequency hopping location of the physical uplink shared channel and the time domain frequency hopping location of the physical downlink shared channel are different may mean that when an end symbol of the physical uplink shared channel and an end symbol of the physical downlink shared channel are the same and a quantity of symbols used to transmit a demodulation reference signal of the physical uplink shared channel and a quantity of symbols used to transmit a demodulation reference signal of the physical downlink shared channel are also the same, the symbol of the physical uplink shared channel and the symbol of the physical downlink shared channel are both determined based on Manner 1, but the symbol of the physical uplink shared channel and the symbol of the physical downlink shared channel that are determined based on Manner 1 are different, and it is further determined, based on the symbol, that the time domain frequency hopping location of the physical uplink shared channel and the time domain frequency hopping location of the physical downlink shared channel are different; or the symbol of the physical uplink shared channel is determined based on Manner 1 and a downlink time domain frequency hopping location of the symbol of the physical downlink shared channel is determined based on Manner 2, or the symbol of the physical uplink shared channel is determined based on Manner 2 and the symbol of the physical downlink shared channel is determined based on Manner 1, or the symbol of the physical uplink shared channel and the symbol of the physical downlink shared channel are both determined based on Manner 2, but the N predefined symbols of the physical uplink shared channel are different from the N predefined symbols of the physical downlink shared channel, or the like.

As shown in Table 8 and Table 9, the symbol of the physical uplink shared channel and the symbol of the physical downlink shared channel are both determined based on Manner 1, but the symbol of the physical uplink shared channel and the symbol of the physical downlink shared channel that are determined based on Manner 1 are different. For example, when a location of the end symbol of the physical downlink shared channel and a location of the end symbol of the physical uplink shared channel are both 11 and the quantity of symbols for transmitting a demodulation reference signal of the physical downlink shared channel and the quantity of symbols used to transmit a demodulation reference signal of the physical uplink shared channel are both 2, the symbol of the physical downlink shared channel is a symbol whose symbol index value is 9 and the symbol of the physical uplink shared channel is a symbol whose symbol index value is 6.

TABLE 8

| Location of an end symbol of a physical uplink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6 | — |
| 10 | — | — | 6 | — |
| 11 | — | — | 6 | 5, 8 |
| 12 | — | — | 7 | 5, 8 |
| 13 | — | — | 7 | 5, 8 |

TABLE 9

| Location of an end symbol of a physical downlink shared channel | Predefined symbol | | | |
|---|---|---|---|---|
| | 0 | 1 | 2 | 3 |
| ≤7 | — | — | — | — |
| 8 | — | — | — | — |
| 9 | — | — | 9 | — |
| 10 | — | — | 9 | — |
| 11 | — | — | 9 | 8, 11 |
| 12 | — | — | 7 | 8, 11 |
| 13 | — | — | 7 | 8, 11 |

TABLE 10

| Location of an end symbol of a physical uplink shared channel | Predefined symbol | | | |
|---|---|---|---|---|
| | 0 | 1 | 2 | 3 |
| ≤7 | — | — | — | — |
| 8 | — | — | — | — |
| 9 | — | — | 6, 9 | — |
| 10 | — | — | 6, 9 | — |
| 11 | — | — | 6, 9 | 5, 8 |
| 12 | — | — | 7 | 5, 8 |
| 13 | — | — | 7 | 5, 8 |

TABLE 11

| Location of an end symbol of a physical downlink shared channel | Predefined symbol | | | |
|---|---|---|---|---|
| | 0 | 1 | 2 | 3 |
| ≤7 | — | — | — | — |
| 8 | — | — | — | — |
| 9 | — | — | 9 | — |
| 10 | — | — | 9 | — |
| 11 | — | — | 9 | 8, 11 |
| 12 | — | — | 7 | 8, 11 |
| 13 | — | — | 7 | 8, 11 |

Notes: 0, 1, 2, and 3 in Table 8 and Table 11 are respectively used to indicate quantities of symbols used to transmit the demodulation reference signal; and "-" is used to indicate that the predefined symbols are null, that is, frequency hopping is not performed.

As shown in Table 8 and Table 9, the symbol of the physical uplink shared channel and the symbol of the physical downlink shared channel are both determined based on Manner 2, but the N predefined symbols of the physical uplink shared channel are different from the N predefined symbols of the physical downlink shared channel. For example, when the location of the end symbol of the physical downlink shared channel and the location of the end symbol of the physical uplink shared channel are both 11 and the quantity of symbols for transmitting a demodulation reference signal of the physical downlink shared channel and the quantity of symbols used to transmit a demodulation reference signal of the physical uplink shared channel are both 3, the symbol of the physical downlink shared channel is a predefined symbol whose symbol index value is 8 or 11 and the symbol of the physical uplink shared channel is a predefined symbol whose symbol index value is 5 or 8.

As shown in Table 10 and Table 11, the symbol of the physical uplink shared channel is determined based on Manner 2, and the symbol of the physical downlink shared channel is determined based on Manner 1. For example, when the location of the end symbol of the physical downlink shared channel and the location of the end symbol of the physical uplink shared channel are both 11 and the quantity of symbols for transmitting a demodulation reference signal of the physical downlink shared channel and the quantity of symbols used to transmit a demodulation reference signal of the physical uplink shared channel are both 2, the predefined symbol of the physical downlink shared channel is a symbol whose symbol index value is 9 and the symbol of the physical uplink shared channel is a predefined symbol whose symbol index value is 6 or 9.

It should be noted that after a time domain frequency hopping location of a shared channel is determined, when the communications device is a receive end, a first hop of the shared channel may be received on a first frequency domain resource and a second hop of the shared channel may be received on a second frequency domain resource based on the time domain frequency hopping location; and when the communications device is a transmit end, the first hop of the shared channel may be sent on the first frequency domain resource and the second hop of the shared channel may be sent on the second frequency domain resource based on the time domain frequency hopping location. For example, assuming that the shared channel is a physical uplink shared channel, the terminal sends a first hop of the physical uplink shared channel on a first frequency domain resource and sends a second hop of the physical uplink shared channel on a second frequency domain resource based on a time domain frequency hopping location; and the network device receives the first hop of the physical uplink shared channel on the first frequency domain resource and receives the second hop of the physical uplink shared channel on the second frequency domain resource based on the time domain frequency hopping location. For another example, assuming that the shared channel is a physical downlink shared channel, the terminal receives a first hop of the physical downlink shared channel on a first frequency domain resource and receives a second hop of the physical downlink shared channel on a second frequency domain resource based on a time domain frequency hopping location; and the network device sends the first hop of the physical downlink shared channel on the first frequency domain resource and sends the second hop of the physical downlink shared channel on the second frequency domain resource based on the time domain frequency hopping location.

In the frequency hopping processing method and the device provided in the various embodiments, the communications device determines the symbol used to transmit the demodulation reference signal of the shared channel and determines the time domain frequency hopping location of the shared channel based on the symbol used to transmit the demodulation reference signal, so that the communications device determines the time domain frequency hopping location of the shared channel based on the symbol used to transmit the demodulation reference signal of the shared channel, thereby implementing frequency hopping of the shared channel in an NR network.

Figure 7:
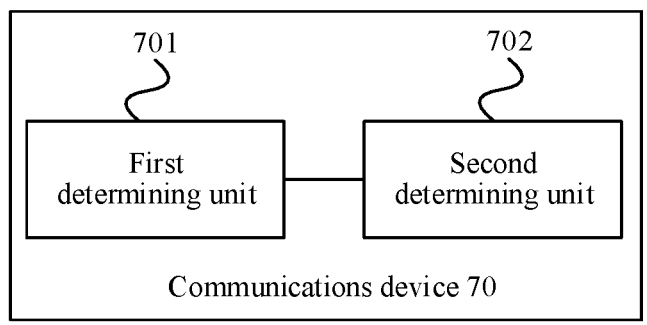
FIG. 7 is a first schematic structural diagram of a communications device according to one embodiment.

FIG. 7 is a first schematic structural diagram of a communications device according to one embodiment. Referring to FIG. 7, the communications device 70 includes a first determining unit 701 and a second determining unit 702.

The first determining unit 701 is configured to determine a symbol used to transmit a demodulation reference signal of a shared channel.

The second determining unit 702 is configured to determine a time domain frequency hopping location of the shared channel based on the symbol used to transmit the demodulation reference signal.

In some embodiments, the time domain frequency hopping location is a start symbol of a second hop of the shared channel, or the time domain frequency hopping location is an end symbol of a first hop of the shared channel.

In some embodiments, the quantity of symbols used to transmit the demodulation reference signal is M, and M is a positive integer; and the second determining unit 702 is specifically configured to determine a time domain frequency hopping location of the shared channel based on a predefined symbol among M symbols used to transmit the demodulation reference signal.

In some embodiments, the predefined symbol among the M symbols has a minimum symbol index value among the M symbols.

Figure 8:
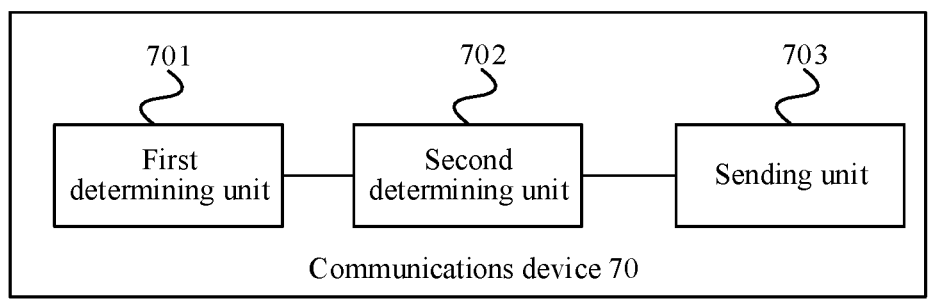
FIG. 8 is a second schematic structural diagram of a communications device according to one embodiment.

FIG. 8 is a second schematic structural diagram of a communications device according to one embodiment. Referring to FIG. 8, the communications device provided in this embodiment may be specifically a network device, and based on a structure of the communications device shown in FIG. 7, the communications device provided in this embodiment may further include a sending unit 703.

The quantity of symbols used to transmit the demodulation reference signal is M, and M is an integer greater than or equal to 2.

The second determining unit 702 is specifically configured to:

select a symbol among N predefined symbols, where the N predefined symbols are a subset of M symbols used to transmit the demodulation reference signal, and N is a positive integer greater than or equal to 2 and less than or equal to M; and determine the time domain frequency hopping location of the shared channel based on the symbol.

The sending unit 703 is configured to send indication information to a terminal, where the indication information is used to indicate the symbol among the N predefined symbols.

Figure 9:
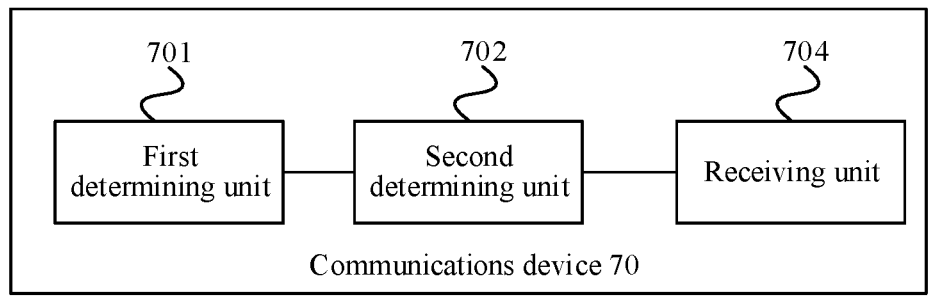
FIG. 9 is a third schematic structural diagram of a communications device according to one embodiment.

FIG. 9 is a third schematic structural diagram of a communications device according to one embodiment. Referring to FIG. 9, the communications device provided in this embodiment may be a terminal, and based on a structure of the communications device shown in FIG. 7, the communications device provided in this embodiment may further include a receiving unit 704.

The quantity of symbols used to transmit the demodulation reference signal is M, and M is an integer greater than or equal to 2.

The receiving unit 704 is configured to receive indication information sent by a network device, where the indication information is used to indicate a symbol among N predefined symbols, and the N predefined symbols are a subset of M symbols used to transmit the demodulation reference signal.

The second determining unit 702 is specifically configured to:

select the symbol among the N predefined symbols according to the indication information, where N is a positive integer greater than or equal to 2 and less than or equal to M; and determine the time domain frequency hopping location of the shared channel based on the symbol.

In some embodiments, the N predefined symbols have minimum symbol index values among the M symbols.

In some embodiments, the determining, by the second determining unit 702, the time domain frequency hopping location of the shared channel based on the symbol specifically includes: using the symbol as the time domain frequency hopping location of the shared channel; or using a symbol obtained after the symbol is shifted, as the time domain frequency hopping location of the shared channel.

In some embodiments, a quantity of symbols used to transmit the demodulation reference signal is 1; and the second determining unit 702 is specifically configured to determine, based on the symbol used to transmit the demodulation reference signal, that the time domain frequency hopping location is null.

In some embodiments, the shared channel includes a physical downlink shared channel and a physical uplink shared channel; and a time domain frequency hopping location of the physical uplink shared channel and a time domain frequency hopping location of the physical downlink shared channel are different.

The network device provided in this embodiment of this application may execute the foregoing corresponding method embodiment, an implementation principle and technical effect are similar, and the details are not described herein.

It should be noted and it should be understood that the division of the units of the network device is merely logical function division, and during actual implementation, all or some of the units may be integrated into a physical entity, or the units may be physically separate. In addition, all the units may be implemented in a form of invoking software through a processing element, or may be implemented in a form of hardware; or some units may be implemented in a form of invoking software through a processing element, and some units may be implemented in a form of hardware. For example, the sending unit may be a separately disposed processing element, or may be implemented by being integrated in a chip of the network device. In addition, the sending unit may alternatively be stored in a memory of the network device in a program form, and a function of the sending unit is invoked and executed by a processing element of the network device. Implementation of other units is similar to that of the sending unit. In addition, all or some of the units may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software. In addition, the foregoing sending unit is a sending control unit, and may receive information through a sending apparatus of the network device, for example, an antenna or a radio frequency apparatus.

The foregoing units may be one or more integrated circuits configured to implement the foregoing method, for example, one or more application-specific integrated circuits (ASIC), one or more microprocessors (DSP), or one or more field programmable gate arrays (FPGA). For another example, when one of the foregoing units is implemented in a form of invoking a program through a processing element, the processing element may be a general purpose processor, for example, a central processing unit (CPU) or another processor that can invoke a program. For another example, these units may be integrated together and implemented in a system-on-a-chip (SOC) form.

Figure 10:
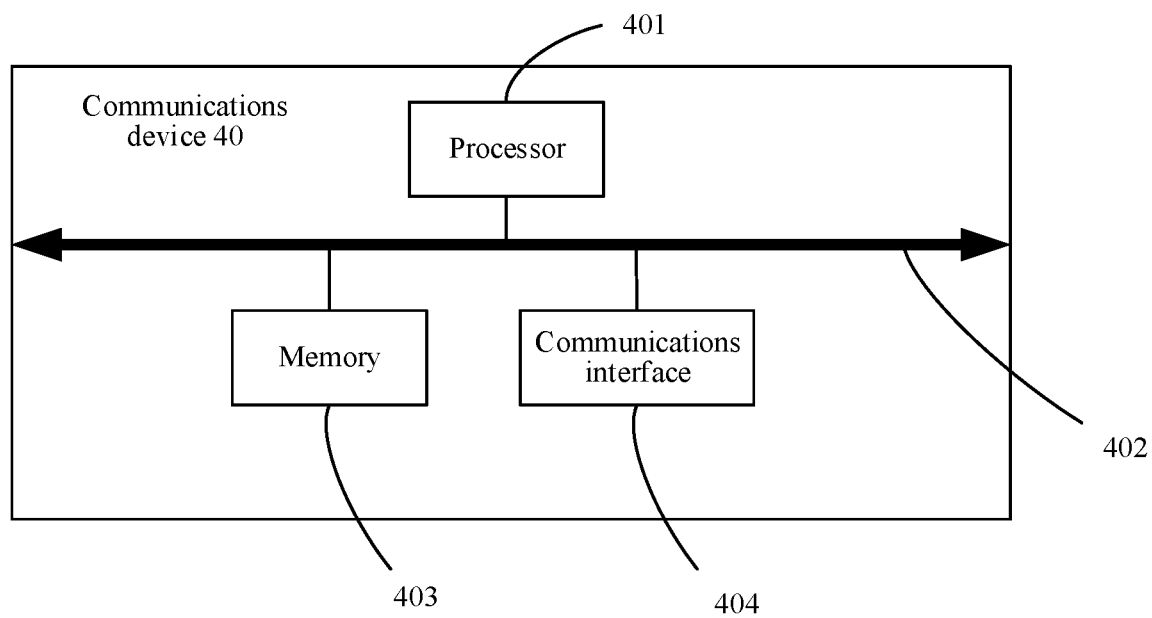
FIG. 10 is a schematic hardware structural diagram of a communications device 40 according to one embodiment.

FIG. 10 is a schematic hardware structural diagram of a communications device 40 according to one embodiment. The communications device 40 includes at least one processor 401, a communications bus 402, a memory 403, and at least one communications interface 404.

The processor 401 may be a general-purpose central processing unit (CPU), a microprocessor, an application-specific integrated circuit (ASIC), or one or more integrated circuits that are configured to control execution of a program in a solution of this application.

The communications bus 402 may include a path for transmitting information between the foregoing components.

The communications interface 404 is applicable to any transceiver-type apparatus and is configured to communicate with another device or a communications network, for example, the Ethernet, a radio access network (RAN), or a wireless local area network (WLAN).

The memory 403 may be a read-only memory (ROM), another type of static storage device that can store static information and an instruction, a random access memory (RAM), or another type of dynamic storage device that can store information and an instruction, or may be an electrically erasable programmable read-only memory (EEPROM), a read-only optical disc (compact disc read-only memory, CD-ROM) or another optical disc storage, a disc storage (including a compact disc, a laser disc, an optical disc, a digital versatile disc, a Blue-ray disc, or the like), a magnetic disk storage medium or another magnetic storage device, or any other medium that can be used to carry or store expected program code in an instruction or data structure form and that can be accessed by a computer, but the present invention is not limited thereto. The memory may independently exist and be connected to the processor through the bus. Alternatively, the memory may be integrated with the processor.

The memory 403 is configured to store application program code for performing the solutions of this application, and execution of the application program code is controlled by the processor 401. The processor 401 is configured to execute the application program code stored in the memory 403, to implement the frequency hopping processing method provided in the following various embodiments.

Alternatively, optionally, in the various embodiments, the processor 401 may execute a processing-related function in the frequency hopping processing method provided in the following various embodiments, and the communications interface 404 is responsible for communicating with another device or a communications network. This is not specifically limited in the various embodiments.

During specific implementation, in an embodiment, the processor 401 may include one or more CPUs.

During specific implementation, in an embodiment, the communications device 40 may include a plurality of processors. Each of these processors may be a single-core (single-CPU) processor, or may be a multi-core (multi-CPU) processor. Herein, the processor may be one or more devices, circuits, and/or processing cores configured to process data (for example, a computer program instruction).

During example implementation, in an embodiment, the communications device 40 may further include an output device and an input device. The output device communicates with the processor 401, and may display information in a plurality of manners. For example, the output device may be a liquid crystal display (liquid crystal display, LCD), a light emitting diode (light emitting diode, LED) display device, a cathode ray tube (cathode ray tube, CRT) display device, or a projector (projector). The input device communicates with the processor 401, and may receive input of a user in a plurality of manners. For example, the input device may be a mouse, a keyboard, a touchscreen device, or a sensing device.

In addition, as described above, the communications device 40 provided in this embodiment of this application may be a chip, a terminal, a network device, or a device having a structure similar to that in FIG. 4. The type of the communications device 40 is not limited in the various embodiments.

In this embodiment, the communications device 80 is presented by integrally classifying functional modules. The "module" herein may be an application-specific integrated circuit (Application-Specific Integrated Circuit, ASIC), a circuit, a processor and a memory that execute one or more software or firmware programs, an integrated logical circuit, and/or another device that can provide the foregoing functions. In a simple embodiment, a person skilled in the art may have an idea that the communications device 80 may be in a form shown in FIG. 4. For example, functions and implementation processes of the first determining unit 701, the second determining unit 702, the sending unit 703, and the receiving unit 704 in FIG. 7 to FIG. 9 may be implemented through the processor 401 and the memory 403 in FIG. 4. Specifically, the first determining unit 701 may perform execution in a manner in which the processor 401 invokes application program code stored in the memory 403. This is not limited in the various embodiments. Alternatively, optionally, functions/implementation processes of the first determining unit 701 and the second determining unit 702 in FIG. 7 may be implemented through the processor 401 in FIG. 4; and the sending unit 703 and the receiving unit 704 in FIG. 7 may be implemented through the communications interface 404 in FIG. 4. This is not limited in the various embodiments.

In some embodiments, one embodiment provides a chip system. The chip system includes a processor, configured to support a communications device in implementing the foregoing frequency hopping processing method, for example, determine a symbol used to transmit a demodulation reference signal of a shared channel. In a possible design, the chip system further includes a memory. The memory is configured to store a necessary program instruction and necessary data of the communications device. The chip system may include a chip, or may include a chip and another discrete device. This is not specifically limited in the various embodiments.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the various embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A frequency hopping processing method, comprising:
   determining, by a communications device, a symbol for transmitting a demodulation reference signal of a shared channel; and
   determining, by the communications device, a time domain frequency hopping location of the shared channel based on the symbol used to transmit the demodulation reference signal.

2. The method according to claim 1, wherein the time domain frequency hopping location is a start symbol of a second hop of the shared channel, or the time domain frequency hopping location is an end symbol of a first hop of the shared channel.

3. The method according to claim 1, wherein a quantity of symbols for transmitting the demodulation reference signal is M, and M is a positive integer; and
   determining, by the communications device, the time domain frequency hopping location of the shared channel based on the symbol for transmitting the demodulation reference signal comprises:
   determining, by the communications device, the time domain frequency hopping location of the shared channel based on a predefined symbol among M symbols used to transmit the demodulation reference signal.

4. The method according to claim 3, wherein the predefined symbol among the M symbols has a minimum symbol index value among the M symbols.

5. The method according to claim 3, wherein determining, by the communications device, the time domain frequency hopping location of the shared channel based on the symbol comprises:
   using, by the communications device, the symbol as the time domain frequency hopping location of the shared channel; or
   using, by the communications device, a symbol obtained after the symbol is shifted, as the time domain frequency hopping location of the shared channel.

6. The method according to claim 1, wherein the communications device is a network device, a quantity of symbols for transmitting the demodulation reference signal is M, and M is an integer greater than or equal to 2;
   determining, by the communications device, the time domain frequency hopping location of the shared channel based on the symbol for transmitting the demodulation reference signal comprises:
   selecting, by the communications device, a symbol among N predefined symbols, wherein the N predefined symbols are a subset of M symbols for transmitting the demodulation reference signal, and N is a positive integer greater than or equal to 2 and less than or equal to M; and
   determining, by the communications device, the time domain frequency hopping location of the shared channel based on the symbol; and, wherein
   the method further comprises:
   sending, by the communications device, indication information to a terminal, wherein the indication information indicates the symbol among the N predefined symbols.

7. The method according to claim 6, wherein the N predefined symbols have minimum symbol index values among the M symbols.

8. The method according to claim 1, wherein the communications device is a terminal, a quantity of symbols used to transmit the demodulation reference signal is M, and M is an integer greater than or equal to 2; and, wherein
   the method further comprises:
   receiving, by the communications device, indication information sent by a network device, wherein the indication information indicates a symbol among N predefined symbols, the N predefined symbols being a subset of M symbols used to transmit the demodulation reference signal; and
   determining, by the communications device, the time domain frequency hopping location of the shared channel based on the symbol for transmitting the demodulation reference signal comprises:
   selecting, by the communications device, the symbol among the N predefined symbols according to the indication information, wherein N is a positive integer greater than or equal to 2 and less than or equal to M; and
   determining, by the communications device, the time domain frequency hopping location of the shared channel based on the symbol.

9. The method according to claim 1, wherein a quantity of symbols for transmitting the demodulation reference signal is 1; and, wherein
   determining, by the communications device, the time domain frequency hopping location of the shared channel based on the symbol for transmitting the demodulation reference signal comprises:
   determining, by the communications device based on the symbol for transmitting the demodulation reference signal, that the time domain frequency hopping location is null.

10. The method according to claim 1, wherein the shared channel comprises a physical downlink shared channel and a physical uplink shared channel; and
   a time domain frequency hopping location of the physical uplink shared channel and a time domain frequency hopping location of the physical downlink shared channel are different.

11. A communications device, comprising a processor and a memory, wherein the memory is configured to store a program, and the processor invokes the program stored in the memory to perform:
   determining a symbol for transmitting a demodulation reference signal of a shared channel; and
   determining a time domain frequency hopping location of the shared channel based on the symbol used to transmit the demodulation reference signal.

12. The communications device according to claim 11, wherein the time domain frequency hopping location is a start symbol of a second hop of the shared channel, or the time domain frequency hopping location is an end symbol of a first hop of the shared channel.

13. The communications device according to claim 11, wherein a quantity of symbols for transmitting the demodulation reference signal is M, and M is a positive integer; and
   determining, by the communications device, the time domain frequency hopping location of the shared channel based on the symbol for transmitting the demodulation reference signal comprises:
   determining, by the communications device, the time domain frequency hopping location of the shared channel based on a predefined symbol among M symbols used to transmit the demodulation reference signal.

14. The communications device according to claim 13, wherein the predefined symbol among the M symbols has a minimum symbol index value among the M symbols.

15. The communications device according to claim 13, wherein determining, by the communications device, the time domain frequency hopping location of the shared channel based on the symbol comprises:
   using the symbol as the time domain frequency hopping location of the shared channel; or
   using a symbol obtained after the symbol is shifted, as the time domain frequency hopping location of the shared channel.

16. The communications device according to claim 11, wherein the communications device is a network device, a quantity of symbols for transmitting the demodulation reference signal is M, and M is an integer greater than or equal to 2; and, wherein
   determining the time domain frequency hopping location of the shared channel based on the symbol for transmitting the demodulation reference signal comprises:
   selecting a symbol among N predefined symbols, wherein the N predefined symbols are a subset of M symbols for transmitting the demodulation reference signal, and N is a positive integer greater than or equal to 2 and less than or equal to M; and
   determining, by the communications device, the time domain frequency hopping location of the shared channel based on the symbol; and, wherein
   the processor is further caused to perform
   sending indication information to a terminal, wherein the indication information indicates the symbol among the N predefined symbols.

17. The method according to claim 16, wherein the N predefined symbols have minimum symbol index values among the M symbols.

18. The communications device according to claim 11, wherein the communications device is a terminal, a quantity of symbols for transmitting the demodulation reference signal is M, and M is an integer greater than or equal to 2; and, wherein
   the processor is further caused to perform:
   receiving indication information sent by a network device, wherein the indication information indicates a symbol among N predefined symbols, the N predefined symbols being a subset of M symbols for transmitting the demodulation reference signal; and
   determining the time domain frequency hopping location of the shared channel based on the symbol for transmitting the demodulation reference signal comprises:
   selecting, by the communications device, the symbol among the N predefined symbols according to the indication information, wherein N is a positive integer greater than or equal to 2 and less than or equal to M; and
   determining, by the communications device, the time domain frequency hopping location of the shared channel based on the symbol.

19. The communications device according to claim 11, wherein a quantity of symbols for transmitting the demodulation reference signal is 1; and, wherein
   determining the time domain frequency hopping location of the shared channel based on the symbol for transmitting the demodulation reference signal comprises:
   determining, based on the symbol used to transmit the demodulation reference signal, that the time domain frequency hopping location is null.

20. The communications device according to claim 11, wherein the shared channel comprises a physical downlink shared channel and a physical uplink shared channel; and
   a time domain frequency hopping location of the physical uplink shared channel and a time domain frequency hopping location of the physical downlink shared channel are different.

* * * * *